United States Patent Office 3,598,760
Patented Aug. 10, 1971

3,598,760

CdSe OR CdS-Se PHOTOCONDUCTORS DOPED WITH A $I_B$ ELEMENT AND EITHER BROMINE OR IODINE

Shigeaki Nakamura and Tadao Nakamura, Kawasaki-shi, and Tadao Kohashi, Yokohama, Japan, assignors to Matsushita Electric Industrial Co., Ltd., Osaka, Japan Filed Mar. 21, 1968, Ser. No. 714,898
Claims priority, application Japan, Mar. 31, 1967, 42/20,847
Int. Cl. G03g *5/02;* H01i *13/00;* C09c *1/10*
U.S. Cl. 252—501 6 Claims

ABSTRACT OF THE DISCLOSURE

CdSe and CdS-Se photoconductors doped with a $I_B$ group element such as copper or silver as activator and at least either one of bromine and iodine as coactivator. Such photoconductors are superior to the conventional CdSe and CdS-Se ones doped with chlorine as coactivator in respect of the sensitivity especially in the longer wavelength range.

This invention relates to photoconductors, and more particularly it pertains to photoconductors which are sensitive to near infrared rays.

A photoconductor formed of cadmium selenide or cadmium sulfo-selenide powder (referred to simply as CdSe and CdS-Se hereinafter, respectively) is also sensitive to light rays of longer wavelength than the photoconduction-sensitive wavelength corresponding to the forbidden-band width thereof. Such photoconductor finds use in a variety of photoelectric devices, photoelectric relay devices and the like. In the case of the conventional CdSe or CdS-Se photoconductor doped with copper and chlorine as impurities, the sensitivity peak corresponding to the impurities occurs at 0.9 micron and the wavelength at which the sensitivity is dropped to 1/10 is 1.05 to 1.1 microns at most, even with the CdSe photoconductor of which the sensitivity extends toward the side of the longest wavelength.

It is a primary object of this invention to provide photoconductors of which the sensitivity with respect to near infrared rays is increased by shifting the impurity peak to longer wavelength side, by introducing bromine or iodine into CdSe or CdS-Se.

It has conventionally been recommended that for impurities to be added to the CdSe and CdS-Se photoconductors, either copper or silver be used as activator and chlorine as coactivator for the purpose of improving both the resistance in the dark and sensitivity.

The inventor has found that good results can be obtained by the addition of either bromine or iodine as coactivator to improve the sensitivity with respect to infrared rays.

Other objects, features and advantages of this invention will become apparent from the following description taken in conjunction with the accompanying drawings, in which.

Figure 1:
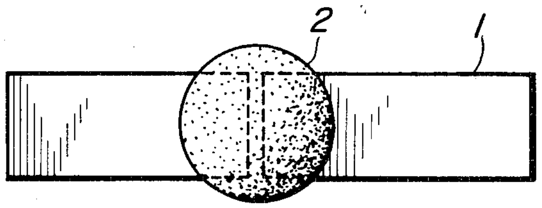
FIG. 1 is a sectional view showing the construction of a photoconductive cell employed for the purpose of measuring the characteristics of the photoconductors according to the present invention.

Description will now be made of several embodiments of the present invention.

EXAMPLE 1

In 200 cc. of distilled water was dispersed 100 grams of CdSe to which 2.5 cc. (about $5\times10^{-4}$ mols/mol) of salt of copper in the form of 0.1 mol solution was in turn added and sufficiently mixed therewith. Then the mixture was dried and broken into fine grains, which were in turn baked either in the atmospheric air on an atmosphere containing oxygen at 600° C. for 40 minutes. At this stage, the material was subjected to relatively hard sintering. The sintered material was then cooled and thereafter, adding some water, was ground into fine grains with the aid of a mortar or the like. Subsequently, the material thus ground was rinsed, immersed in mixed solution of 0.5 mol of cadmium bromide and 1 mol of ammonium bromide solutions, filtered, dried and then sieved. Thereafter, it was baked in a similar manner to the above. The thus baked material was sieved, and 1 gram of sulphur was added thereto. Then, the mixture was baked in an inert gas such as argon or the like at 480° C. for 15 minutes, and it was again baked in a vacuum for 10 minutes. The final baked material was cooled and thereafter sieved.

The solution of copper salt added at the first stage can be relatively optionally selected. That is, use can be made of a solution not only of copper bromide but also of copper halide, copper nitrate, copper sulphate, etc.

Preferably, the quantity of copper to be added is $2\times10^{-4}$ to $10^{-3}$ atoms per one atom of the parent body of CdSe. A monad metal such as silver may also be employed instead of copper. The baking temperature used at the first stage is not necessarily limited to 600° C., but at lower temperatures it is not possible to achieve sufficient diffusion of the activator into the parent body while at higher temperatures the grinding process becomes difficult to be carried out because of exceeding sintering. Thus, the desired temperature ranges from 500° C. to 700° C. This sintering process is a process for doping the activator and the resulting powder does not possess enough photoconductive sensitivity. The baking at the second stage was a process of growing the parent body crystals and doping bromine into the parent body. The baking at the third stage was a process of replacing with sulphur part of the coactivator excessively doped and selenium vacancies occurring during the baking at the previous stage and changing the contact between the powder grains, thereby increasing the resistance in the dark. The baking temperature may be in the range of 400 to 500° C. The powder finally obtained, which is the CdSe photoconductor having an excellent sensitivity to near infrared rays, has good photoconductive sensitivity and characteristics in the dark.

EXAMPLE 2

A CdSe photoconductor was produced by a similar mehod to that described above in Example 1 except that use was made of cadmium iodide instead of cadmium bromide and ammonium bromide of amonium iodide added subsequent to the baking at the first stage in Example 1. In this example, too, good characteristics were achieved, like in the preceding example.

EXAMPLE 3

A CdSe photoconductor was produced by a similar method to that described in Example 1 except that part of the cadmium bromide added after the baking at the first stage in Example 1 was replaced with cadmium iodide and/or part of the ammonium bromide with ammonium iodide. Excellent characteristics could be realized, like in Examples 1 and 2.

EXAMPLE 4

A CdSe photoconductor was produced by a similar method to that of Example 1 except that part of the cadmium bromide added after the baking at the first stage in Example 1 was replaced with cadmium chloride and/or part of the ammonium bromide with ammonium chloride. In this case, by suitably selecting the ratio of bromides to chlorides, it is possible to obtain a photoconductor possessing a near infrared ray sensitivity characteristic intermediate between that of the conventional CdSe photoconductor containing chloride as coactivator and that of the one produced in Example 1. In this example, such characteristic can also be realized if part of the cadmium iodide in Example 2 is replaced with cadmium chloride and/or part of the ammonium iodide with ammonium chloride.

EXAMPLE 5

Although CdSe was used as parent body in Examples 1, 2, 3 and 4, it is also possible to employ as parent body CdS-Se of an optional composition ratio. In this case, the larger the quantity of CdS, the smaller becomes the extend of improvement in the sensitivity to near infrared rays, whereas good photoconductive sensitivity and characteristics in the dark are achieved.

As will be appreciated from the foregoing, in the examples described above, since a coactivator such as bromine or iodine was added which deteriorates the characteristic in the dark as commonly known in the art, use was made of a method of restraining the doping of such coactivator as much as possible. More specifically, there are not all added such a flux as the one added at the first stage for the purpose of crystal growth and halide (normally $NH_4Cl$ or the like, for example) serving as oxidation preventing agent added at the first of the ordinary method. Hence, the material is subjected to hard-sintering subsequent to the baking at the first stage. It is to be noted that the inclusion of the step of grinding the sintered material constitutes one of the most important features of the methods described above. Although, in the foregoing examples, use was made of cadmium bromide or cadmium iodide to add bromine or iodine, it is also possible to employ other bromides or iodides.

Although, in the above examples, description has been made of the case where use is made of a powder-like photoconductor, it is possible to produce a variety of photoconductors such as a sintered film, a sintered cell or the like which is sensitive to near infrared rays without departing from the spirit of the present invention.

Figure 2:
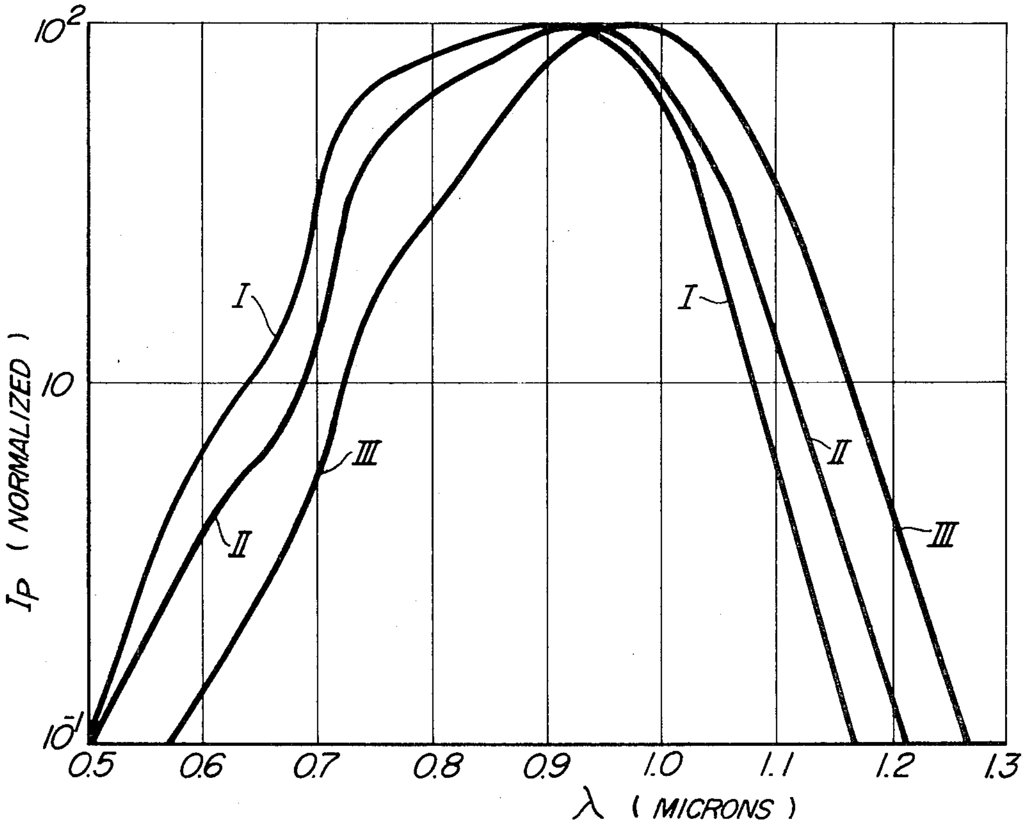
FIG. 2 shows the spectral sensitivity characteristics of CdSe photoconductors containing chlorine, iodine and bromine as coactivator, respectively.
Figure 3:
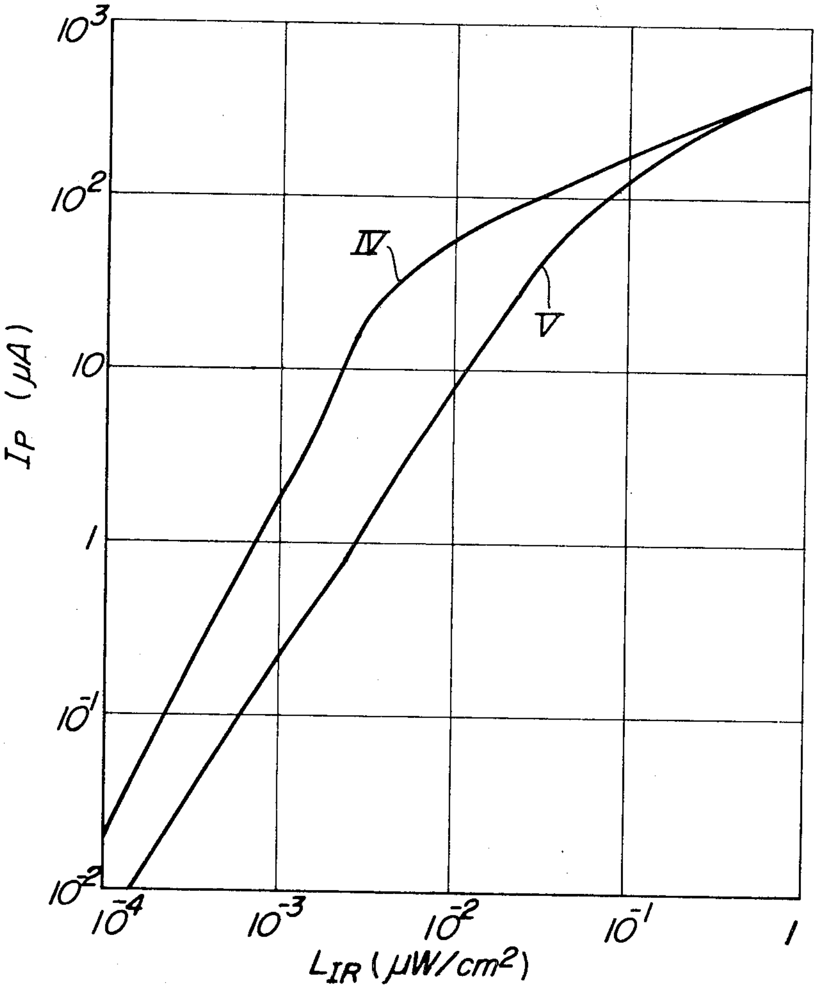
FIG. 3 shows the relationships with respect to the intensity of incident infrared rays of the photocurrent occurring in the photoconductors containing chlorine and bromine as coactivator respectively.

Description will now be made of the characteristics of the near infrared photoconductors produced in the aforementioned examples. As test samples for the measurement, use was made of a photoconductor adhered to electrodes 7 mm. x 0.7 mm. with ethyl cellulose as shown in FIG. 1. Referring to FIG. 2, there are shown the spectral characteristic (curve I) of the conventional CdSe photoconductor using chloride as coactivator, that (curve II) of CdSe photoconductor using iodine as coactivator in accordance with this invention and that (curve III) of the CdSe photoconductor using bromine as coactivator in accordance with this invention, wherein the horizontal axis indicates the wavelength $\lambda$ of the incident light ray in microns and the vertical axis indicates the normalized photocurrents. It will be seen from FIG. 2 that the near infrared sensitivity of the photoconductors embodying the present invention is apparently improved over that of the conventional one; the sensitivity peak of the latter occurs at a wavelength of 0.9 micron, while that of the CdSe photoconductor containing iodine as coactivator in accordance with the present invention appears at a wavelength of 0.94 micron and that of the CdSe photoconductor containing bromine as coactivator occurs at a wavelength of 0.96 micron. Assume that the wavelength at which the sensitivity is dropped to 1/10 of the peak is the longer wavelength limit, then such limits of the curves I, II and III are 1.09 microns, 1.12 microns and 1.17 microns, respectively. This shows that the materials according to this invention are advantageous over the conventional one. FIG. 3 shows the relationships between the photocurrent and intensity of the incident infrared rays of the CdSe photoconductor containing bromine as coactivator (curve IV) as described in one of the foregoing examples and of the conventional CdSe one containing chloride as coactivator (curve V). The test samples used for the measurement were of the same construction as shown in FIG. 2, and a D.C. voltage of 400 v. was applied thereto. The incident infrared rays corresponding to the longer wavelength side spectral sensitivity peak of each test sample were obtained by passing a radiation ray from an incandescent lamp through an interference filter. That is, use was made of an interference filter representing maximum translucency at 0.96 micron in the case of the curve IV while in the case of the curve V, use was made of an interference filter which represents maximum translucency at 0.9 micron. The intensities were measured with the aid of a vacuum thermopile. In FIG. 3, the vertical axis indicates the photocurrent $I_p$ in microamperes, and the horizontal axis indicates the incident infrared ray intensity $L_{IR}$ expressed in terms of micro-watts per square centimeter. From FIG. 3, it will be seen that the material embodying the present invention is advantageous over the conventional material of this kind in respect of photo-sensitivity.

Table 1 shows the positions corresponding to the longer wavelength side peaks of the spectral sensitivity characteristics of CdSe photoconductors containing bromine and chloride as coactivator described in Example 1 and the longer wavelength limits of the same definition as the above in terms of ratio of the quantity of bromine compounds to the total quantity of chlorine compounds and bromine compounds, wherein the quantity is measured in mols and ratio 0 indicates the material containing only chlorine compounds as coactivator or the conventional CdSe photoconductor, and the quantity ratio 1 shows the CdSe containing only bromine compounds as coactivator.

TABLE 1

| Ratio of quantity of bromine compounds to the total quantity of bromine and chlorine compounds | Characteristics | |
|---|---|---|
| | Near infrared ray sensitivity peak, μ | Longer wavelength limit, μ |
| 0 | 0.90 | 1.07 |
| 0.1 | 0.91 | 1.09 |
| 0.2 | 0.92 | 1.09 |
| 0.3 | 0.94 | 1.11 |
| 1.0 | 0.96 | 1.17 |

From Table 1, it will be clearly seen that the substances embodying the present invention exhibit increased sensitivity to near infrared rays. A typical example of application of the near infrared photoconductor is, among others, a solid-state infrared image converter device, which is a plate-like device comprising at least an electroluminescent layer and photoconductive layer which are laminated and at least two electrodes. By applying a voltage between the two electrodes, an image represented by radiation rays such as infrared rays or the like projected onto the photoconductive layer can be converted to a visible output image which is displayed on the electroluminescent layer. In most cases, the sensitivity of the device of this type depends upon the sensitivity of the photoconductor in use. Briefly, the sensitivity of such device can be expressed in terms of differences in the intensity of the output light rays with respect to the constant intensity of incident infrared rays. Needless to say, it is desirable that the sensitivity be such that a great change in the output light rays results from the irradiation of radiation rays of a low intensity.

Table 2 shows the characteristics such as described above of a solid-state infrared image converter device including a photoconductive layer formed of the conventional CdSe photoconductor containing chloride as coactivator and those of a similar device using CdSe containing bromine as coactivator in accordance with the present invention. As infrared ray source use was made of a tungsten light source provided with a filter formed by a silicon plate 2 mm. in thickness which passes light rays of a longer wavelength than 1.1 microns therethrough. The intensity was measured in terms of a unit of $\mu$w./cm.$^2$ with the aid of a thermopile calorie meter. The ratio of differences in the output light rays is expressed in terms of the ratio of the output light rays resulting from the irradiation of said infrared rays with respect to luminescence in the dark.

TABLE 2

| Intensity of input light rays ($\mu$w./cm.$^2$) | Ratio of variations in the output light rays of solid state infrared image converter device | |
|---|---|---|
| | Device using CdSe containing chlorine as coactivator | Device using CdSe containing bromine as coactivator |
| 0 | 1.0 | 1.0 |
| $10^2$ | 1.2 | 1.9 |
| $3\times10^2$ | 2.0 | 3.5 |
| $10^3$ | 5.5 | 10.0 |

From Table 2, it is also seen that the substances according to this invention represent very excellent photoconduction characteristics with respect to near infrared rays.

The method of manufacturing the photoconductive substances according to the present invention as described above may be summarized as follows: A solution containing a $I_B$ element such as copper or the like is added to CdSe, or a mixture or solid solution of CdS and CdSe, the resultant mixture is then dried, and thereafter it is baked in an atmosphere containing oxygen into sintered block. The sintered block thus baked is ground into powder to which is in turn added bromide, iodide or their mixture, and it is again baked in an atmosphere containing oxygen.

As described above, the near infrared photoconductor according to this invention, wherein the sensitive wavelength can be greatly extended toward the longer wavelength side, can be utilized to advantage as solid state infrared image converter device and infrared ray-sensitive material for a variety of infrared ray photoelectric converter devices, photoelectric relay devices, photoelectric switch devices and the like.

We claim:

1. A method of manufacturing a photoconductive powder, comprising the steps of preparing a mixture by adding a solution containing a $I_B$ element selected from the group consisting of copper and silver, as activator to a material consisting essentially of CdSe, drying said mixture, sintering said mixture at a temperature between 500° and 700° C. in an atmosphere containing oxygen, grinding the sintered mixture into powder, rinsing said powder, adding to the rinsed powder at least one member selected from the group consisting essentially of bromide and iodide in the form of a solution as coactivator material, then baking the thus prepared mixture having said coactivator material added thereto in an atmosphere containing oxygen at a temperature between 500° and 700° C., and thereafter subjecting the baked mixture to heat treatment in an atmosphere containing sulphur at a temperature between 400° and 500° C.

2. A method of manufacturing a photoconductive powder, comprising the steps of preparing a mixture by adding a solution containing a $I_B$ element selected from the group consisting of copper and silver, as activator to a material consisting essentially of a mixture or solid solution of CdS and CdSe, drying said mixture, sintering said mixture at a temperature between 500° and 700° C. in an atmosphere containing oxygen, grinding the sintered mixture into powder, rinsing said powder, adding to the rinsed powder at least one member selected from the group consisting essentially of bromide and iodide in the form of a solution as coactivator material, then baking the thus prepared mixture having said coactivator material added thereto in an atmosphere containing oxygen at a temperature between 500° and 700° C., and thereafter subjecting the baked mixture to heat treatment in an atmosphere containing sulphur at a temperature between 400° and 500° C.

3. The method according to claim 1, comprising the further step of breaking said mixture into fine grains after said drying step.

4. The method according to claim 2, comprising the further step of breaking said mixture into fine grains after said drying step.

5. A method of manufacturing a photoconductive powder, comprising the steps of preparing a mixture by adding a solution containing a $I_B$ element selected from the group consisting of copper and silver, as activator to a material consisting essentially of CdSe, drying said mixture, sintering said mixture at a temperature between 500° and 700° C. in an atmosphere containing oxygen, grinding the sintered mixture into powder, rinsing said powder, adding to the rinsed powder at least one member selected from the group consisting essentially of cadmium bromide and cadmium iodide in the form of a solution as coactivator material, then baking the thus prepared mixture having said coactivator material added thereto in an atmosphere containing oxygen at a temperature between 500° and 700° C., and thereafter subjecting the baked mixture to heat treatment in an atmosphere containing sulphur at a temperature between 400° and 500° C.

6. A method of manufacturing a photoconductive powder comprising the steps of preparing a mixture by adding a solution containing a $I_B$ element selected from the group consisting of copper and silver, as activator to a material consisting essentially of CdSe, drying said mixture, sintering said mixture at a temperature between 500° and 700° C. in an atmosphere containing oxygen, grinding the sintered mixture into powder, rinsing said powder, adding to the rinsed powder at least one member selected from the group consisting essentially of a mixture of cadmium bromide and ammonium bromide and a mixture of cadmium iodide and ammonium iodide in the form of a solution as coactivator material, then baking the thus prepared mixture having said coactivator material added thereto in an atmosphere containing oxygen at a temperature between 500° and 700° C., and thereafter subjecting the baked mixture to heat treatment in an atmosphere containing sulphur at a temperature between 400° and 500° C.

References Cited

UNITED STATES PATENTS

| | | | |
|---|---|---|---|
| 2,879,182 | 3/1959 | Pakswer et al. | 117—201 |
| 2,916,678 | 12/1959 | Bube et al. | 317—237 |
| 2,937,353 | 5/1960 | Wasserman | 338—15 |
| 2,958,932 | 11/1960 | Goercke | 29—155.71 |
| 3,051,839 | 8/1962 | Carlson et al. | 250—211 |
| 3,065,515 | 11/1962 | Antes | 25—157 |
| 3,151,982 | 10/1964 | Corrsin et al. | 96—1 |
| 3,238,150 | 3/1966 | Behringer et al. | 252—501 |
| 3,379,527 | 4/1968 | Corrsin et al. | 96—1.5 |
| 3,443,103 | 5/1969 | Lakshmanan | 250—211 |
| 3,486,059 | 12/1969 | Kiuchi | 313—65 |

GEORGE F. LESMES, Primary Examiner

J. C. COOPER, Assistant Examiner

U.S. Cl. X.R.

96—1.5; 106—301